United States Patent
Marechal (10) Patent No.: US 7,034,092 B2
(45) Date of Patent: *Apr. 25, 2006

(54) PROCESS FOR PRODUCING BIMODAL POLYETHYLENE RESINS

(75) Inventor: Philippe Marechal, Nivelles (BE)

(73) Assignee: Total Petrochemicals Research Feluy, Feluy (BE)

(*) Notice: Subject to any disclaimer, the term of this patent is extended or adjusted under 35 U.S.C. 154(b) by 0 days.

This patent is subject to a terminal disclaimer.

(21) Appl. No.: 10/398,162

(22) PCT Filed: Oct. 2, 2001

(86) PCT No.: PCT/EP01/11394

§ 371 (c)(1),
(2), (4) Date: Nov. 17, 2003

(87) PCT Pub. No.: WO02/28922

PCT Pub. Date: Apr. 11, 2002

(65) Prior Publication Data

US 2004/0077803 A1    Apr. 22, 2004

(30) Foreign Application Priority Data

Oct. 4, 2000    (BE) .................................. 00121646

(51) Int. Cl.
*C08F 2/14*    (2006.01)
*C08F 210/02*    (2006.01)

(52) U.S. Cl. ................... 526/65; 526/64; 526/160; 526/124.2; 526/348.4; 526/348.6

(58) Field of Classification Search ................ 526/64, 526/65, 124, 348, 348.2, 352, 160, 348.4, 526/348.6
See application file for complete search history.

(56) References Cited

U.S. PATENT DOCUMENTS

| 5,391,654 | A  |   | 2/1995  | Ahvenainen et al. |        |
|-----------|----|---|---------|-------------------|--------|
| 5,639,834 | A  |   | 6/1997  | Debras et al.     |        |
| 5,684,097 | A  | * | 11/1997 | Palmroos et al.   | 526/64 |
| 6,063,878 | A  |   | 5/2000  | Debras et al.     |        |
| 6,225,421 | B1 |   | 5/2001  | Promel et al.     |        |
| 6,355,741 | B1 | * | 3/2002  | Marechal          | 526/64 |
| 2001/0014724 | A1 | | 8/2001  | Promel et al.     |        |
| 2001/0018499 | A1 | | 8/2001  | Marissal et al.   |        |
| 2001/0025088 | A1 | | 9/2001  | Marissal          |        |

FOREIGN PATENT DOCUMENTS

EP    0580930 A1    2/1994

* cited by examiner

Primary Examiner—Caixia Lu
(74) Attorney, Agent, or Firm—William D. Jackson (57) ABSTRACT

A process for producing bimodal polyethylene resins in two reactors in series, the process comprising producing a first polyethylene resin fraction in a first slurry loop reactor in a diluent in the presence of a catalyst and producing a second polyethylene resin fraction in a second slurry loop reactor, serially connected to the first reactor, in the diluent in the presence of the catalyst, the first polyethylene resin fraction being passed from the first reactor to the second reactor together with the catalyst, one of the first and second reactors producing a resin fraction of higher molecular than the resin fraction produced by the other of the first and second reactors, characterised in that the first reactor is fed with a feed of ethylene and diluent having an ethylene content of at least 70 wt % based on the weight of the diluent and in that in the first reactor the slurry of polyethylene in the diluent has a solids content of at least 30 wt % based on the weight of the diluent.

22 Claims, 6 Drawing Sheets

Figure 4

Figure 7

PROCESS FOR PRODUCING BIMODAL POLYETHYLENE RESINS

The present invention relates to a process for producing bimodal polyethylene resins, in particular such resins for use as pipe resins or as film or blow moulding resins. Most particularly, the present invention relates to a process for producing bimodal polyethylene resins in two reactors in series.

It is known to produce polyethylene resins for use as pipe or film or blow moulding resins in two reactors in series in a liquid full slurry loop process. One of the reactors produces a high molecular weight fraction and the other of the reactors produces a low molecular weight fraction. The resultant bimodal resin, comprising a chemical blend of the two fractions has particular application, for example, for use as a pipe resin which exhibits good mechanical properties such as environmental stress crack resistance (ESCR) and slow crack growth resistance. It is known that in order to improve the mechanical properties of the resin, it is desired to separate as far as possible the polymerisation reactions occurring in the two reactors so that the difference in density and molecular weight between the two resin fractions is enhanced for any given target density of the resin. While a number of processes are known in the art for enhancing the separation of the polymerisation reactions occurring in the two reactors, nevertheless there is still a need in the art for an improved polymerisation process for the production of bimodal polyethylene pipe resins which still further increases the reactor independence. Some of these processes are disclosed for example in the following prior art documents:

EP-A-649,860 discloses of process for co-polymerising ethylene in two liquid full loop reactors serially connected, wherein the comonomer is introduced in the first reactor, wherein the high molecular weight fraction of the polymer is produced in the first reactor and the low molecular weight fraction is produced in the second reactor and wherein the transfer from the first to the second reactor is operated through one or more settling legs.

EP-A-580,930 discloses a process for homo- or co-polymerising ethylene in two liquid full loop reactors serially connected, wherein the comonomer is introduced in the first reactor and wherein the concentration of hydrogen is very low in the first reactor and very high in the second reactor.

EP-A-897,934 discloses a process for preparing ethylene polymers in two serially connected reactors wherein an ethylene homopolymer having a melt flow index MI2 of 5 to 1000 g/10 min is formed in the first reactor and a copolymer of ethylene and hexene having a melt flow index MI5 of 0.01 to 2 g/10 min is formed in the second reactor.

EP-A-832,905 discloses a process for preparing ethylene homo- or co-polymers in two liquid full loop reactors serially connected, in the presence of a chromium-based catalyst, wherein a low molecular weight homopolymer of ethylene is produced in the first reactor and a high molecular weight homo- or co-polymer of ethylene is produced in the second reactor.

WO 92/12181 discloses a method for homo- or co-polymerising ethene in the presence of a Ziegler-Natta catalyst and a possible comonomer and hydrogen. The polymerisation is carried out in a loop reactors at a temperature higher than the critical temperature but lower than the melting temperature of ethene, and at a pressure higher than the critical pressure of the mixture.

In single slurry loop reactors for the production of monomodal polyethylene resins, it is known that if the pump which is provided in the loop reactor for circulating the slurry around the loop is provided with high output power, this can lead to higher solids concentration in the slurry circulating around the reactor. Furthermore, the solids concentration can also be increased by using a circulating pump having a diameter that is larger than the diameter of the reactor tube. This is achieved by providing a localised enlargement in the reactor tube at the location of the propeller or vanes of the pump. Furthermore, it is known that the replacement of the conventional settling legs in a slurry loop reactor, which are provided for periodic and sequential take off of the polyethylene fluff by a so-called "continuous product take off" can also lead to higher solids concentration in the reactor.

The present invention provides a process for producing bimodal polyethylene resins in two reactors in series, the process comprising producing a first polyethylene resin fraction in a first slurry loop reactor in a diluent in the presence of a catalyst and producing a second polyethylene resin fraction in a second slurry loop reactor, serially connected to the first reactor, in the diluent in the presence of the catalyst, the first polyethylene resin fraction being passed from the first reactor to the second reactor together with the catalyst, one of the first and second reactors producing a resin fraction of higher molecular than the resin fraction produced by the other of the first and second reactors, characterised in that the first reactor is fed with a feed of ethylene and diluent having an ethylene content of at least 70 wt % based on the weight of the diluent and in that in the first reactor the slurry of polyethylene in the diluent has a solids content of at least 30 wt % based on the weight of the diluent.

In the preferred aspect of the invention, the catalyst is a Ziegler-Natta catalyst and the slurry in the first reactor has a solids content of from 30 to 60 wt % based on the weight of the diluent. Optionally, the catalyst is a Ziegler-Natta catalyst and the feed of ethylene and diluent for the first reactor has an ethylene content of from 70 to 250 wt % based on the weight of the diluent.

In an alternative preferred aspect of the invention, the catalyst is a metallocene catalyst and the slurry in the first reactor has a solids content of from 35 to 60 wt % based on the weight of the diluent. In accordance with this preferred aspect, optionally the feed of ethylene and diluent for the first reactor has an ethylene content of from 90 to 250 wt % based on the weight of the diluent.

More preferably, the slurry of polyethylene and diluent in the first reactor has a solids content of at least 45 wt % and the first polyethylene resin fraction is continuously removed from the first reactor.

Preferably, the relatively high molecular weight fraction is polymerised in the first reactor by copolymerisation of ethylene and a comonomer comprising at least one α-olefin having from 3 to 12 carbon atoms. The preferred comonomers are butene, hexene and octene, the most preferred one being 1-hexene. Preferably, the comonomer concentration is from 2 to 15 wt % based on the weight of the diluent.

Preferably, the relatively low molecular weight polyethylene resin fraction is produced in the second reactor by homopolymerisation of ethylene in the presence of hydrogen. Preferably, the hydrogen is present in the second reactor in an amount of from almost 0 to 5 mole% based on the weight of the diluent in the second reactor. Near to 0 vol% occurs for example with metallocene catalysts that consume the major part of the hydrogen fed to the reactor.

The present invention is predicated on the discovery by the present inventor that when bimodal polyethylene resins are produced in two reactors in series, the utilisation of increased solids content in the first reactor by achieving a minimum proportion of ethylene monomer feed to diluent feed in the first reactor, irrespective of whether the first reactor produces the relatively high molecular weight fraction or the relatively low molecular weight fraction of the ultimate bimodal polyethylene resin blend, this can lead to enhanced reactor independence between the first and second reactors. This consequently tends to enhance the properties of the polyethylene resin blend, particularly when the blend is for use as a pipe resin. Most particularly, the slow crack growth resistance, as determined by a full notch creep test (FNCT) or a notched pipe test (NPT) is greatly enhanced by the process of the present invention. In addition, the resin produced in accordance with the invention has improved resistance to rapid crack propagation as measured by the Charpy impact strength test. Furthermore, the use of higher solids content and increased ethylene feed to the first reactor also increases the catalyst productivity.

Embodiments of the present invention will now be described by way of example only with reference to the accompanying drawings, in which.

Figure 1:
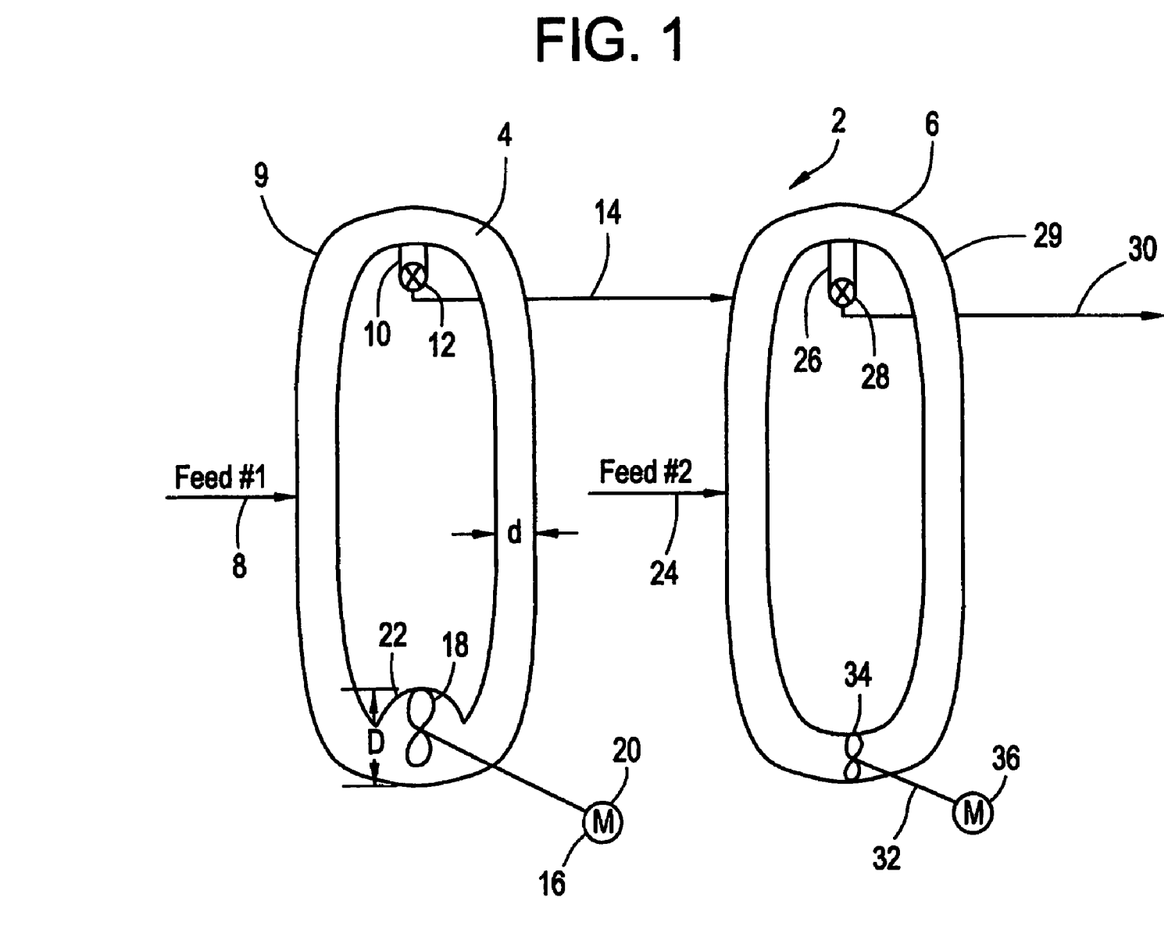
FIG. 1 is a schematic diagram of an apparatus comprising two serially connected slurry loop reactors for use in an embodiment of the process for producing bimodal polyethylene resins in accordance with the present invention.

Referring to FIG. 1, there is shown schematically an apparatus for producing bimodal polyethylene resins in accordance with the invention in two reactors in series. The apparatus, designed generally as 2, comprises a first slurry loop reactor 4 and a second slurry loop reactor 6 serially connected thereto and downstream thereof. The first slurry loop reactor 4 is provided with a feed, indicated as feed No. 1, along an inlet line 8. Feed No. 1 comprises ethylene monomer, one of (a) a comonomer comprising at least one α-olefin having from 3 to 12 carbon atoms or (b) hydrogen, and a catalyst. The catalyst may comprise a Ziegler-Natta catalyst, a chromium-based catalyst, in particular comprising chromium oxide deposited on a support such as silica, a metallocene catalyst, or a LTM (Late Transition Metal) catalyst. The slurry loop reactor 4 is of generally known construction and is provided with a settling leg 10 which depends downwardly from the first slurry loop reactor 4. In this embodiment the settling leg 10 is located at the upper portion 9. At the bottom of the settling leg 10 is provided a valve 12 for selective and periodic removal of polyethylene fluff from the settling leg 10. In large scale reactors, there is a series of legs (like 10) and corresponding valves (like 12) operating successively. For continuous product take off, valve 12 remains open. An outlet line 14 communicates between the valve 12 and the second slurry loop reactor 6 for feeding from the first slurry loop reactor 4 to the second slurry loop reactor 6 the first polyethylene resin fraction produced in the first slurry loop reactor together with the catalyst. The first slurry loop reactor 4 is additionally provided with a pump 16 which includes a propeller 18 driven by a motor 20. The propeller 18 is located in a lower portion 22 of the first slurry loop reactor 4 and the lower portion 22 is provided with an increased internal diameter (D) compared to the internal diameter (d) of the remaining parts of the first slurry loop reactor 4.

The second slurry loop reactor 6 is also provided with a respective inlet line 24 through which a feed (feed No. 2) of additional ethylene monomer and one of (a) a comonomer comprising an α-olefin having from 3 to 12 carbon atoms or (b) hydrogen are fed to the second slurry loop reactor 6. The second slurry loop reactor 6 is also provided with a respective settling leg 26 and associated valve 28, in this embodiment located at an upper portion 29 of the second slurry loop reactor 6. An outlet line 30 is provided at the downstream end of the valve 28 for feeding the ultimate bimodal polyethylene resin, comprising a blend of the first and second polyethylene resin fractions respectively produced in first and second reactors 4,6, for further processing, for example by an extruder (not shown).

The second slurry loop reactor 6 is additionally provided with a respective pump 32 comprising a propeller 34 driven by a motor 36.

In one aspect of the process of the invention, a relatively high molecular weight polyethylene resin fraction is produced in the first slurry loop reactor 4 by copolymerisation of ethylene and the comonomer and a relatively low molecular weight polyethylene resin fraction is produced in the second slurry loop reactor 6 by homopolymerisation of ethylene in the presence of hydrogen. In an alternative aspect of the invention the low molecular weight resin fraction is produced in the first slurry loop reactor 4 and the high molecular weight fraction is produced in the second slurry loop reactor 6. For either aspect, it has been found that the use of a high solids concentration in the first loop reactor leads to improved mechanical properties of the resultant bimodal polyethylene resin blend.

In accordance with the process of the invention, the slurry circulated around the first slurry loop reactor 4 by the pump 16 has a solids content of at least 30 wt % based on the weight of the diluent, more preferably from 30 to 60 wt % for a Ziegler-Natta catalyst or from 35 to 60 wt % for a metallocene catalyst. Most preferably, for either catalyst, the solids content of the slurry in the first slurry loop reactor 4 is at least 40 wt % or more preferably at least 45 wt % based on the weight of the diluent.

The higher solids content in the first loop reactor is achieved by providing that the feed for the first slurry loop reactor 4 has an ethylene content of at least 70 wt % based on the weight of the diluent, more preferably from 85 to 250 wt %, yet more preferably above 90 wt % for Ziegler-Natta catalysts and preferably from 90 to 250 wt %, more preferably above 110 wt %, based on the weight of the diluent, for a metallocene catalyst.

The present invention can be employed to produce not only pipe resins but also film resins and blow moulding resins exhibiting improved mechanical properties, in particular improved slow crack growth resistance.

For example, the present invention can produce PE100 pipe resins with a 50/50 wt % concentration of low molecular weight and high molecular weight fractions. The high molecular weight fraction may have a density of less than 0.930 g/cc, most preferably less than 0.926 g/cc, with in particular the density being less than 0.928 g/cc for metallocene catalysts, and most particularly less than 0.925 g/cc for metallocene catalysts. The high molecular weight fraction may correspondingly have a high load melt index (HLMI) measured in accordance with the procedures of ASTM D 1238 at a load of 21.6 kg and a temperature of 190° C. of less than 1 g/10 min, more preferably less than 0.5 g/10 min, with the corresponding values of less than 2.5 g/10 min for metallocene catalysts, more preferably less than 1 g/10 min for metallocene catalysts. For the low molecular weight fraction, the density is preferably higher than 0.958 g/cc, typically higher than 0.950 g/cc for metallocene catalysts, and most preferably the low molecular weight fraction is pure homopolymer. The low molecular weight fraction preferably has a melt index $MI_2$ measured in accordance with the procedures of ASTM D 1238 at a load of 2.16 kg and a temperature of 190° C. of at least 20 g/10 min, more preferably above 35 g/10 min.

For example, the present invention can produce bimodal MDPE film resins with a 50/50 wt % concentration of low molecular weight and high molecular weight fractions. The high molecular weight fraction may have a density of less than 0.920 g/cc, most preferably less than 0.917 g/cc. The high molecular weight fraction may correspondingly have a high load melt index (HLMI) of less than 5 g/10 min, more preferably less than 2.5 g/10 min. For the low molecular weight fraction, the density preferably ranges from 0.940 g/cc to pure homopolymer, typically from 0.950 g/cc to pure homopolymer. The low molecular weight fraction preferably has a melt index $MI_2$ higher than 10 g/10 min, more preferably higher than 24 g/10 min.

All these ranges depends on the weight fraction of high molecular weight in the final product. The ones given here are for a 50/50 proportion between the high molecular weight and the low molecular weight fractions. For example, reducing the high molecular weight fraction decreases the density of the high molecular weight resin at constant final resin density. Typically, for pipe resins the blend comprises from 35 to 65 wt % high molecular weight fraction, more preferably from 40 to 57 wt % high molecular weight fraction. For film resins, the range is broader depending on the key resin properties that are required. Typically, the high molecular weight fraction comprises from 30 to 75 wt % of the blend.

Figure 2:
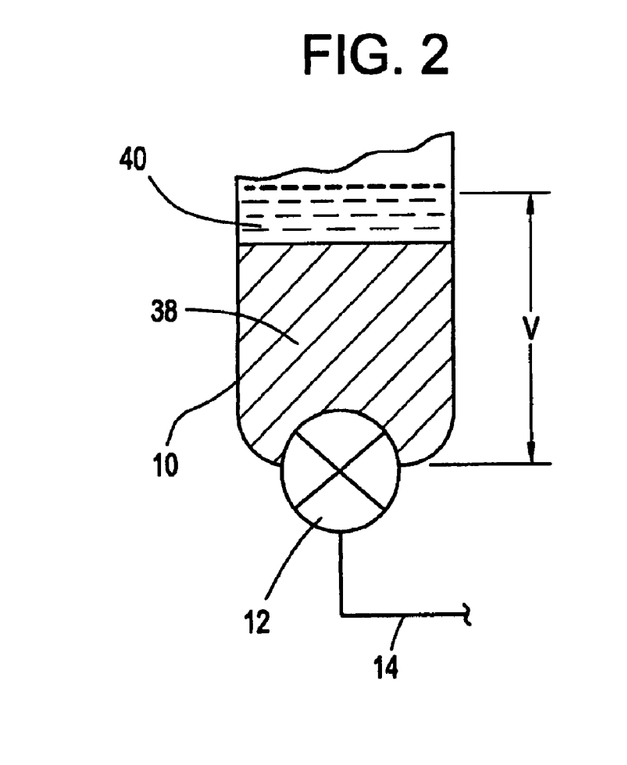
FIG. 2 is an enlarged schematic view of part of a settling leg of the first slurry loop reactor of the apparatus of FIG. 1.

In the first slurry loop reactor 4, the first polyethylene resin fraction is polymerised and progressively the polyethylene resin fluff settles in the settling leg 10. An enlarged schematic view of the settling leg 10 is illustrated in FIG. 2. It may be seen that the polyethylene resin fluff 38 has progressively settled at the bottom of the settling leg 10. The valve 12 is ordinarily closed. When it is desired to transfer the first polyethylene resin fraction 38 from the first slurry loop reactor 4 to the second slurry loop reactor 6, together with the catalyst therein, the valve 12 is opened and a volume V, as shown in FIG. 2, of both the polyethylene resin fluff 38 and a minor proportion of slurry 40 is transferred along outlet line 14 to the second slurry loop reactor 6.

In order to enhance reactor independence between the first and second slurry loop reactors 4,6, it is desired that the proportion of slurry 40 in the volume V is minimized. This not only ensures a maximum efficiency in the transfer of the first polyethylene resin fraction 38 from the first reactor 4 to the second reactor 6, but also ensures that the transfer of comonomer or hydrogen, depending on, respectively, whether or not the high molecular weight or low molecular weight fraction is polymerised in the first slurry loop reactor 4, is transferred additionally in the volume V to the second slurry loop reactor 6. Desirably, the amount of comonomer or hydrogen transfer to the second slurry loop reactor is minimized in order to ensure reactor independence, leading not only to a high difference in density between the first and second polyethylene resin fractions, but also a large difference in the molecular weight. Ideally, the high molecular weight/low density polyethylene resin fraction should be as low as possible in density and high as possible in molecular weight. Equally, the low molecular weight/high density polyethylene resin fraction should be as high as possible in density and as low as possible in molecular weight.

For a process configuration where the low molecular weight fraction is produced in the second reactor, it is relatively easy to achieve a large difference in molecular weight, because an extremely low hydrogen feed in the first reactor and a high hydrogen feed only to the second reactor gives very different molecular weight products; as well known in Ziegler Natta and metallocene catalysts, the hydrogen is a very effective chain termination agent. The achievement of increased reactor independence tends to increase the density difference between the two resin fractions. For the opposite process configuration, where the high molecular weight fraction is produced in the second reactor, hydrogen tends to be transferred with the slurry from the first reactor into the second reactor. However, without being bound to the theory it is believed that the production of the low molecular weight in the first reactor with metallocene or LTM or hydrogen scavenging catalysts and the high molecular weight in the first reactor for Ziegler Natta catalysts are preferred configurations.

Higher reactor independence therefore allows the enlargement of the difference in molecular weight between the two fractions. For any given bimodal pipe resin, this comprises a proportion of the high molecular weight fraction and a proportion of the low molecular weight fraction. The proportions of the two fractions can of course be varied. However, for a 50/50 wt % blend between the two fractions, it is clear that in order to achieve a target density of the combined blend forming the pipe resin, which target density is required commercially, for any decrease in density of the high density, low molecular weight fraction there must be a corresponding increase in the density of the low density high molecular weight fraction. Increased reactor independence enables the achievement of enlarged density differences or enlarged differences in molecular weight between the two fractions, leading to improved mechanical properties.

Figure 3:
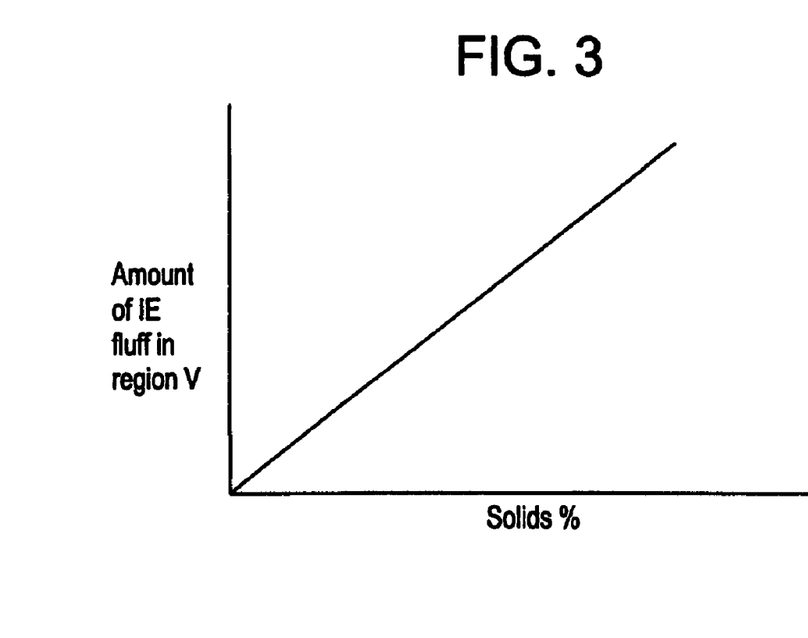
FIG. 3 is a graph showing schematically the relationship between the amount of polyethylene fluff recovered from a region of the settling leg shown in FIG. 2 with the solids content of the slurry in the first reactor.

Referring to FIG. 3, it may be seen that the amount of the polyethylene fluff in the region V shown in FIG. 2 tends to increase with an increase in the solids content of the slurry in the first slurry loop reactor. It may thus be seen that an increase of the solids content of the slurry circulated around the first slurry loop reactor enhances the proportion of polyethylene fluff transferred from the settling leg of the first reactor 4 to the second reactor 6, which in turn reduces the amount of comonomer or hydrogen transferred to the second reactor 6, which again in turn increases reactor independence.

Both the maximum solids content of the slurry and the maximum amount of ethylene in the diluent are dependent on the choice of catalyst, for example a Ziegler-Natta catalyst or metallocene catalyst. This is because the nature of the polyethylene fluff, in particular the bulk density of the polyethylene fluff, is catalyst dependent. The choice of catalyst affects the morphology of the polyethylene resin fluff and the solids content of the slurry is limited to a maximum value at which formation of agglomerates by the polyethylene fluff occurs, which inhibits circulation of slurry around the loop in conjunction with reliable settling in the settling leg, which agglomeration in turn depends on the morphology of the fluff and the bulk density. The bulk density of the PE fluff ranges from about 0.3 to 0.5 g/cc. When using a Ziegler-Natta catalyst, the bulk density of the polyethylene resin is typically about 0.3 g/cc and when using a metallocene catalyst the polyethylene resin fluff typically has a higher bulk density of about 0.4 g/cc. This can also be the case with prepolymerized catalysts. It is desired to achieve the maximum solids content in the slurry which enables the settling of polyethylene fluff in the settling leg to be maximised, but with a minimum amount of the ethylene/diluent ratio which in turn is dependent upon the achievable bulk density, which is catalyst dependent.

Thus when using a Ziegler-Natta catalyst for example, the bulk density is relatively low and so the maximum solids content is achieved by utilising a maximum ethylene/diluent weight ratio in the first reactor of about 1.2. In contrast, when using a metallocene catalyst the maximum bulk density of the polyethylene fluff is higher, up to about 0.5 g/cc, and this permits a higher maximum ethylene/diluent ratio of about 2.5 to be employed. Around 92 to 99.5% of the ethylene feed into the first loop reactor is polymerised to polyethylene and so the ethylene/diluent ratio is selected for achieving the maximum solids content to achieve maximum settling, but with the corresponding minimum proportion of ethylene in the diluent which is dependent upon the achievable bulk density based on the catalyst employed.

The polymerisation temperature in the first loop reactor 4 typically ranges from 70 to 100° C., most preferably about 80° C. when the HMW fraction is produced in the first reactor and from 80 to 120° C., most preferably around 95° C. when the LMW is produced in the first reactor. The polymerisation temperature also affects the particular solids content of the slurry employed, because an increase in temperature tends to lower the viscosity of the diluent. The polymerisation pressure is from 30 to 90 bars, most preferably about 41 bars.

The minimum feed ratio of ethylene in the diluent, which is preferably isobutane, is given by the solids concentration in the reactor, in the case without any settling:

Solids %=Weight of PE/(Weight of PE+Weight of diluent)
Without settling this approximates to:
Solids %~=Ethylene feed/(Ethylene feed+diluent feed)
Thus C2/diluent feed=1/((1/solids %)−1)

Figure 4:
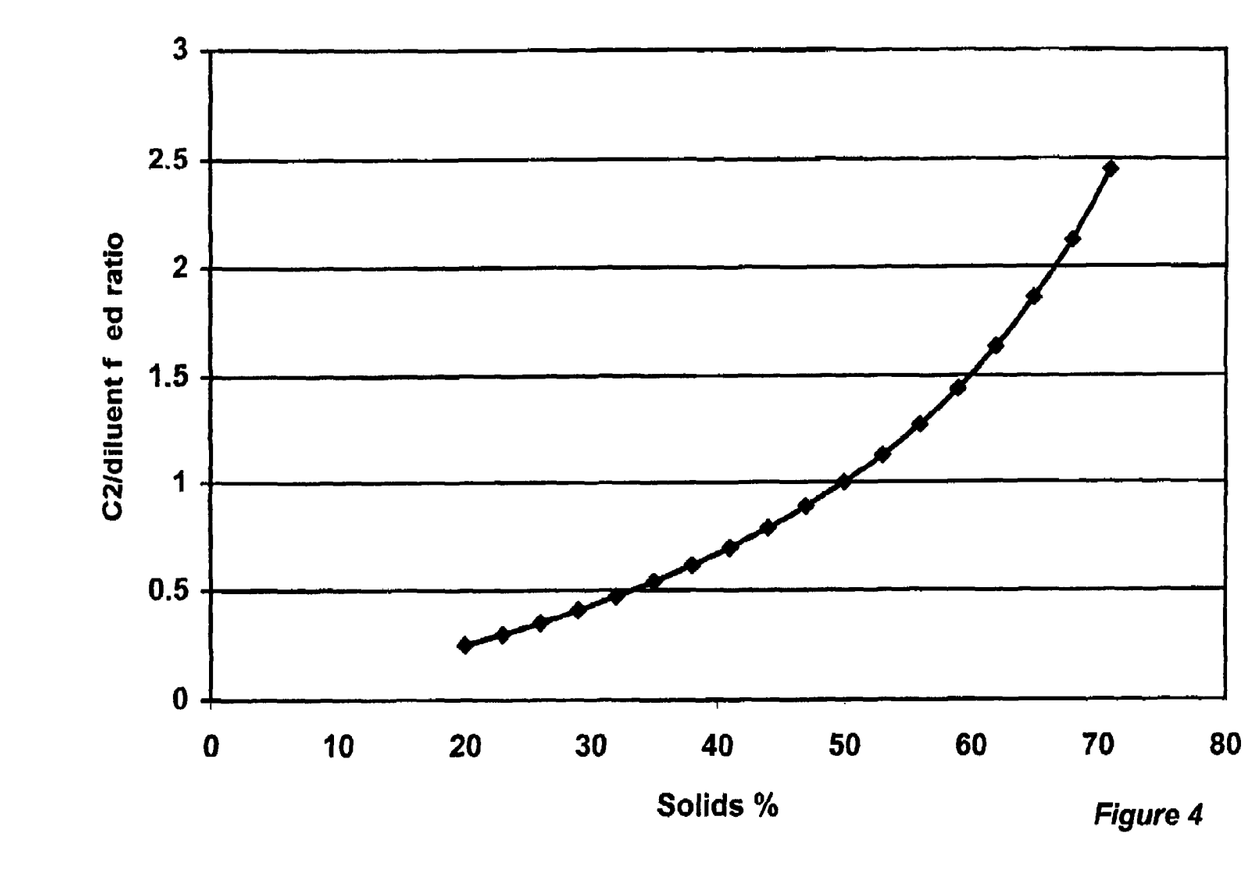
FIG. 4 is a graph showing schematically the relationship between the C2/diluent feed ratio for the reactor without settling and the solids content in the reactor.

This is the minimum value for the C2/diluent feed ratio for a given solids (purely no settling). The relationship between the C2/diluent feed ratio and the solids % is illustrated in FIG. 4. It may be seen that the feed ratio generally increases with increase in the solids % value, and it may be seen that a minimum value for the C2/diluent feed ratio for any given solids % value is provided. It is apparent that in order to get a high C2/diluent feed ratio, which increases reactor independence, it is necessary to maximise the solids content of the first reactor.

Figure 5:
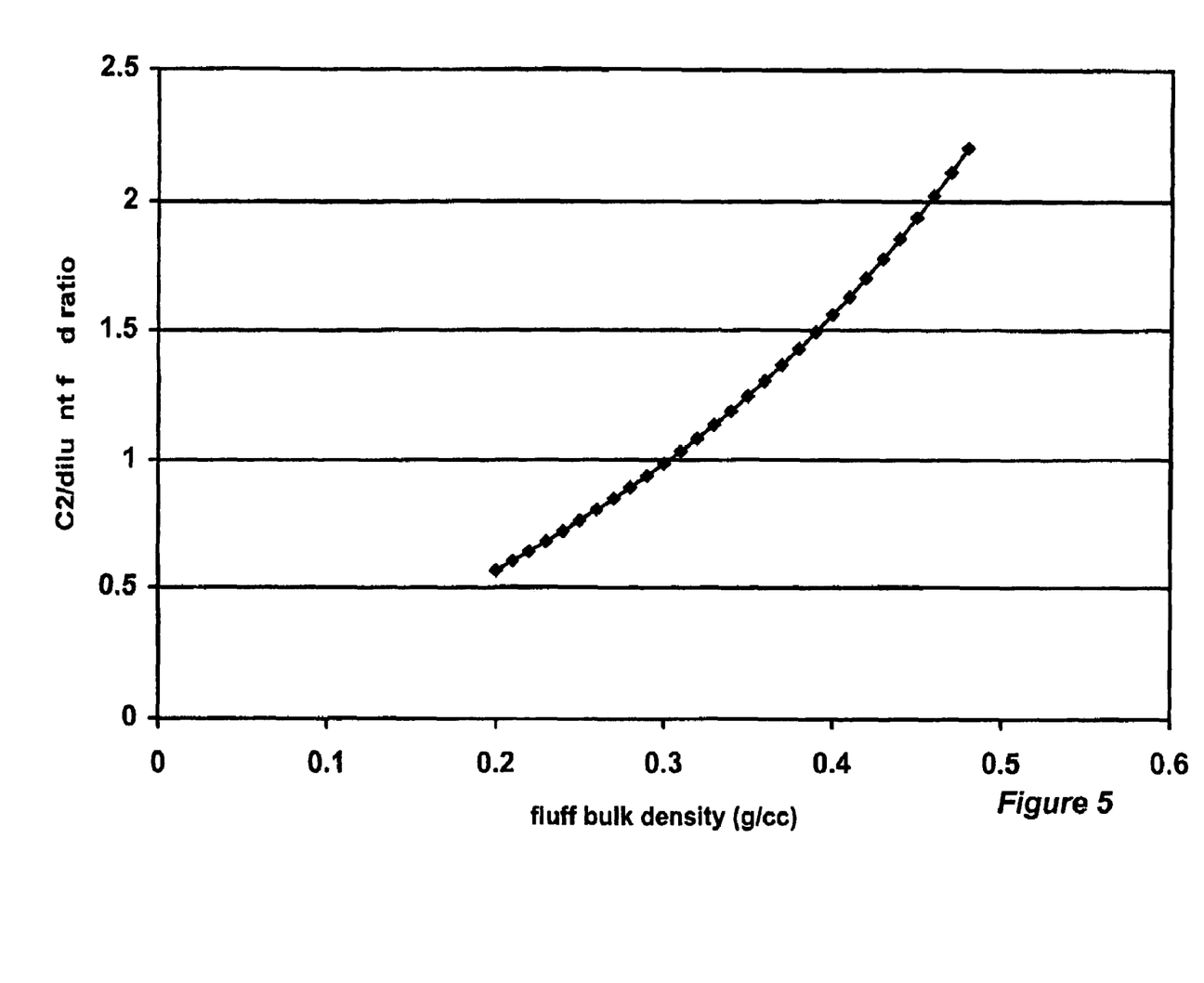
FIG. 5 is a graph showing schematically the relationship between the C2/diluent for the reactor at 100% of settling and the fluff bulk density in the reactor; this is close to the maximum C2/diluent feed ratio for a given bulk density.

The maximum C2/diluent feed ratio in a system where settling is ideally 100% completed depends on the nature of the fluff. The bulk density of the fluff in the settling leg will in fact control the maximum value for the C2/diluent feed ratio. The relationship between the C2/diluent feed ratio and fluff bulk density is illustrated in FIG. 5. This shows the maximum possible value of the C2/diluent feed ratio for any given fluff bulk density, which depends on the fluff morphological properties which are primarily controlled by the nature of the catalyst. Although the bulk density can reach as high as 0.5 g/cc in some cases, particularly with a metallocene catalyst, most commonly the bulk density is from 0.33 to 0.45 g/cc.

If there is a need to use a higher C2/diluent feed ratio, at a fixed bulk density, one option is to use supercritical diluent in the reactor as described hereinbelow. With supercritical diluent, these temperature ranges given above for liquid diluent are about 10° C. to 20° C. higher and reactor pressure from 37 to 100 bars, more preferably from 50 to 90 bars, yet more preferably from 55 to 70 bars. Another consequence of the use of supercritical diluent increases the C2/diluent feed ratio, typically the C2/diluent ratio given in the FIGS. 4 and 5 are twice as high, thus up to about 500%.

Figure 6:
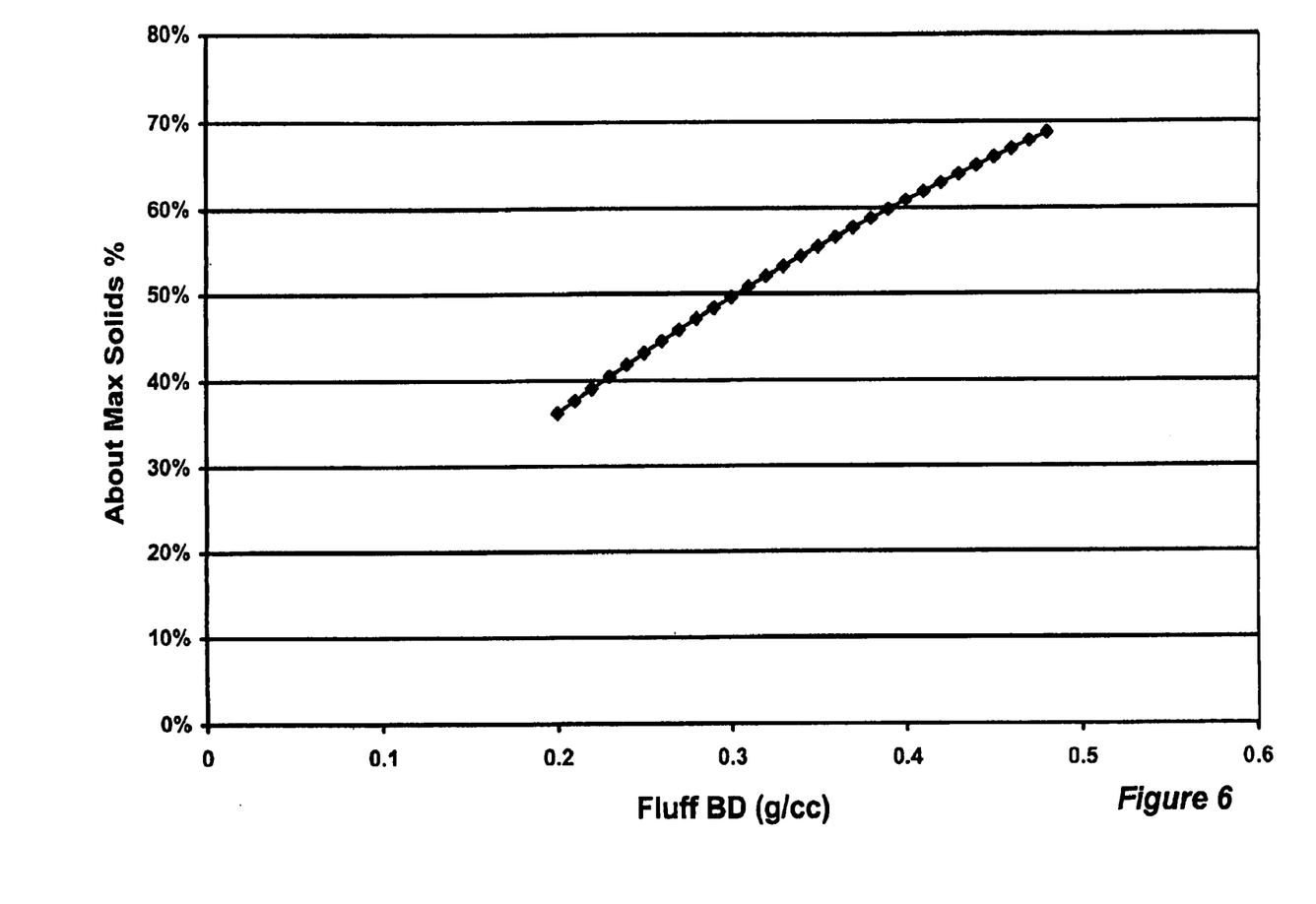
FIG. 6 is a graph showing schematically the relationship between the maximum solids content in the reactor and the fluff bulk density in the reactor.

In addition, the fluff bulk density in the reactor also controls the maximum solids content at which the reactor can be operated. The relationship between the maximum solids content and the bulk density is illustrated in FIG. 6.

In order to use a higher solids content in the first slurry loop reactor 4, the minimum operating pump power of the pump 16 is relatively high and preferably the diameter D of the lower portion 22 of the first slurry loop reactor 4 in which the propeller 18 is located is increased to permit the pump more readily to circulate the higher solids content slurry around the first slurry loop reactor 4. The power needed to circulate a slurry having a given solids content around the reactor depends on the reactor diameter. If the reactor diameter is increased, less power is required, but that is at the expense of the cooling surface area and consequently at the expense of reactor throughput. For a reactor of particularly large size, the dissipation of such high power may require the provision of multiple pumping sections or a pumping section with a large pump diameter, which allows dissipation of the pumping power in a larger volume of slurry, thereby avoiding the potential of cavitation in the slurry. The provision of pumps in two different pumping sections has the drawback that there is a higher probability of bearing problems with two pumps and there is also a requirement for a long horizontal section between the two pumps or a reactor with a larger number of vertical legs. The present inventor has determined that for a variety of reactor sizes represented by a reactor volume, there is a preferred internal diameter for the reactor, a preferred pump minimum operating power and a most preferred pump minimum operating power. The corresponding values for three reactor sizes of 19, 70 and 100 m$^3$ are summarised in Table 1.

In the second slurry loop reactor 6, the inventor has found that the degree of settling of the polyethylene resin fluff in the settling leg 26 of the second slurry loop reactor 6 tends to increase with a corresponding increase in solid fraction and in the bulk density of the polyethylene resin fluff in the second slurry loop reactor 6. For large scale production of bimodal polyethylene pipe resins, the second slurry loop reactor 6 may additionally be provided with a larger diameter circulating pump 32 having a construction similar to that of the pump 16 for the first reactor 4 illustrated in FIG. 1 and continuous produce take-off through the settling leg 26, which would then be provided at the bottom of the loop. This would provide the advantages of high plant throughput and high catalyst productivity. The continuous product take off provides also the advantage of increasing plant reliability by eliminating a series of settling legs and corresponding valves.

The present inventor has found that when the solids fraction of the slurry circulating around the first slurry loop reactor 4 is above 45 wt %, it is possible to employ, instead of periodic polyethylene fluff removal through the settling leg 10 illustrated in FIG. 1, continuous removal of the polyethylene fluff through a settling leg provided at the bottom of the reactor, which is thus absent a valve or which is just working with a open valve, this valve being closed for example for reactor filling operations. The polyethylene resin fraction produced in the first reactor is removed continuously from the settling leg and continuously transferred to the second reactor 6.

Provided the solids concentration is sufficiently high, that is above 45% of solids, this does not reduce significantly the reactor independence. Such continuous removal and transfer of the first polyethylene resin fraction tends to reduce the possibility of the settling leg being plugged by the resin and leakage problems. Moreover, it is believed by the inventor that the use of a continuous product take-off as compared to a discontinuous produce take-off may tend to increase the solids concentration in the first slurry loop reactor 4.

The inventor has found that the use of a high solids concentration in the first loop reactor leads not only to improved mechanical properties of the polyethylene resin blend but also by maximising the solids concentration in the first reactor, in particular by using a larger pump diameter and optionally continuous product transfer of the polyethylene resin fraction to the second reactor at the end of a settling section, this leads to improved reactor throughput, improved product properties and improved catalyst productivity.

In accordance with preferred aspects of the invention, the use of high solids content in the first reactor is achieved by providing a sufficiently high pump power in the first reactor, which may be achieved by the provision of one or multiple pumping sections, and optionally by enlarging the section diameter in the pumping zones. Optionally, the second reactor should also be equipped with a large pump diameter. Most preferably, continuous product take-off is employed for transferring the polyethylene resin fraction and catalyst from the first reactor to the second reactor. Optionally, a centrifuge or hydrocyclone may be employed in the transfer section between the two reactors, for reducing the transfer of diluent and correspondingly comonomer or hydrogen, from the first reactor to the second reactor. Preferably, the second reactor also employs continuous product take-off in order to maximize the solids concentration and reactor throughput of the second reactor.

In accordance with one preferred aspect of the invention, the diluent may be present under supercritical conditions. Thus the diluent is at a pressure greater than the critical pressure Pc and at a temperature greater than the critical temperature Tc. Under these conditions, there is no thermodynamic transition between the gas phase and the liquid phase and the homogeneous supercritical fluid has the properties of a dense gas and a low density liquid. Either or both of the two loop reactors may be employed with supercritical diluent. When the first loop reactor is operated under supercritical conditions, the pressure is typically from 37 to 100 bars, more preferably from 50 to 90 bars, yet more preferably from 55 to 70 bars and the temperature is typically from 70 to 140° C., more preferably from 80 to 100° C. Under supercritical conditions, as a result of faster settling and increased packing of the polyethylene fluff at the bottom of the settling leg, significantly less diluent is additionally removed with the polyethylene resin fraction under supercritical conditions as compared to subcritical conditions. This assists in enhancing the independence of the two reactors.

The present invention will now be described in greater detail with reference to the following non-limiting Examples.

EXAMPLE 1

The apparatus of FIG. 1 was employed to produce a bimodal polyethylene resin in which in the first slurry loop reactor a high molecular weight fraction was produced by copolymerisation of ethylene and 1-hexene and in the second slurry loop reactor the low molecular weight fraction was produced by homopolymerisation of ethylene in the presence of hydrogen. In the first reactor the temperature was 80 ° C. and the pressure was 42 bars and in the second reactor the temperature was 90° C. and the pressure was 41 bars. The catalyst comprised a Ziegler-Natta catalyst activated with an alkyl aluminium. The first reactor was fed with a feed of ethylene, comonomer and diluent, the diluent comprising isobutane, with the ethylene content of the feed being 71 wt % based on the weight of the diluent. The comonomer concentration in the first reactor was adapted to reach the required density, higher comonomer content resulting in lower density. The remaining process parameters, comprising the solids content in the first reactor (R1); the throughput through the reactors in tonnes per hour, the ratio of ethylene to diluent outputted from the first reactor (R1) (corresponding substantially (99%) to the ratio of ethylene to diluent inputted to the first reactor (R1)); the ratio between 1-hexene and ethylene in the second reactor (R2); and the ratio between the hydrogen and ethylene contents in the second reactor (R2), are specified in Table 2.

As compared to a typical PE100 pipe resin produced using a Ziegler-Natta catalyst in two reactors in series, (a) the density of the first fraction which was half a point lower for the inventive example, and (b) the melt index in the first reactor and reactor proportions were identical, and of course the final resin melt index and density were equal.

The resultant bimodal polyethylene resin fluff was extruded and stabilized with antioxidants and then the resultant resin was subjected to a full notch creep test (FNCT) specified in ASTM F1473 in which the time for failure was recorded for a circumferentially notched specimen having a 10 mm×10 mm cross section and a notch depth of 16% of the thickness, the specimen having been submitted to a net tensile strength of 4 MPa at a temperature of 95° C. in a 2% solution of Arkopal for determining the slow crack growth resistance of the pipe resins . It may be seen from Table 2 that the pipe resin exhibited a time to failure under the FNCT test of at least 2000 hours.

Furthermore, the pipe resin was subjected to a Charpy impact energy test to determine the resistance of the pipe resin to rapid crack propagation in which the resin was tested under the procedures of ISO 179/1A at a temperature of −10° C. and the Charpy impact strength is specified in Table 2. Furthermore, the catalyst productivity is specified in Table 2.

From Table 2 it may be seen that the ratio between hexene and ethylene in the second reactor was low. This accordingly reduced the degree of incorporation of hexene into the low molecular weight homopolymer which was produced in the second reactor. Accordingly, this increased the density of the polyethylene resin fraction produced in the second reactor. As a consequence, the polyethylene resin fraction produced in the first reactor may have an even lower density, since the final product density of a pipe resin is fixed by the technical specification. Having a lower density for the high molecular weight resin fraction produced in the first reactor allows a higher slow crack growth resistance (FNCT or NPT) to be achieved.

Figure 7:
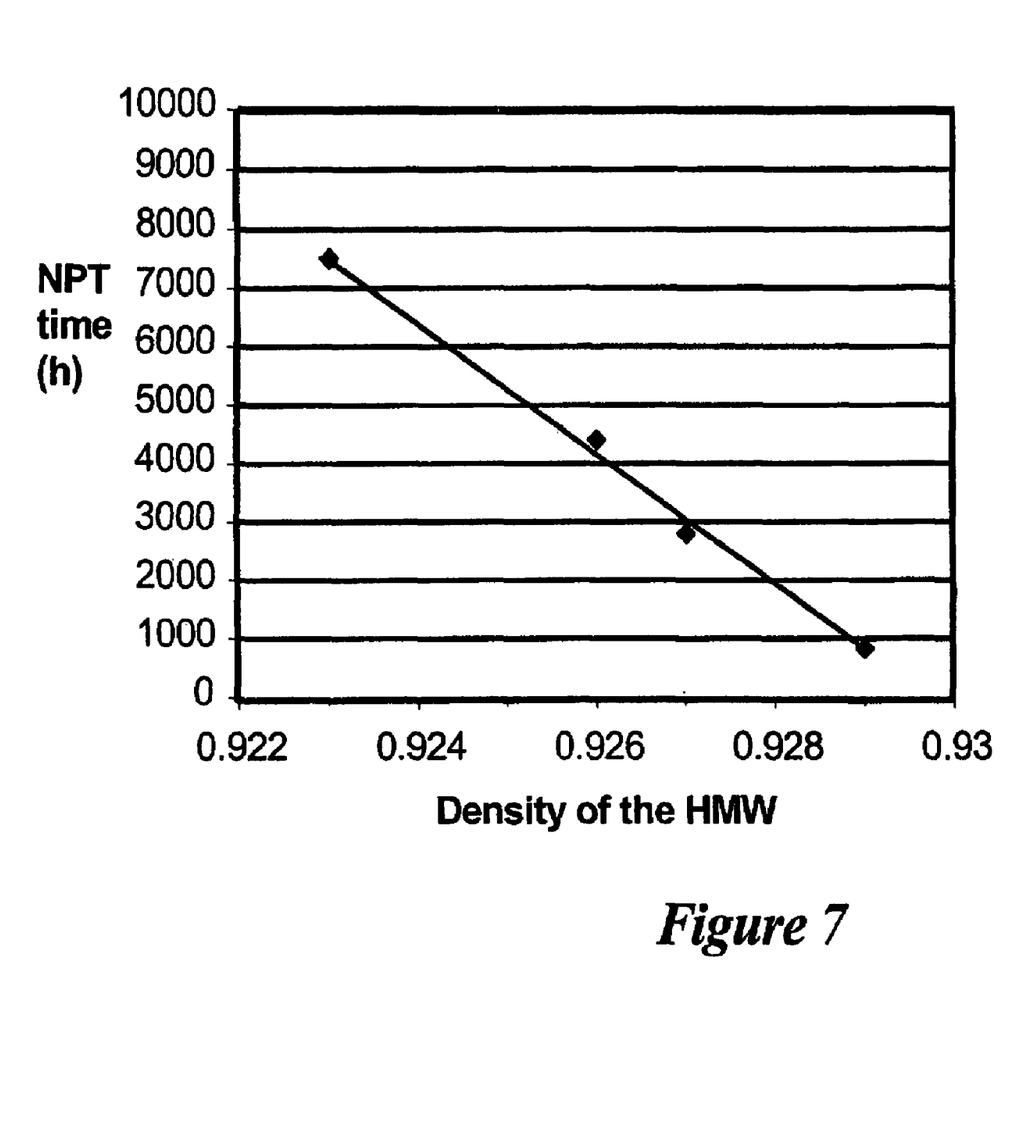
FIG. 7 is a graph showing schematically the relationship between the slow crack growth resistance as determined by the notched pipe test (NPT) and the density of the polyethylene fluff in the first reactor.

Referring to FIG. 7, there is shown the general relationship between the slow crack growth resistance as determined by the notched pipe test with the density of the polyethylene fluff in the first reactor when the first reactor of the two serially connected reactors is employed to produce the low density/high molecular weight resin fraction. It may be seen that the slow crack growth resistance tends to increase with reduced density of the polyethylene fluff produced in the first reactor. This confirms that reactor independence is beneficial to the slow crack growth resistance a property required by pipe resins, and also film resins and blow moulding resins.

Comparative Example 1

In this Comparative Example, the apparatus of FIG. 1 was employed using a lower solids content for the slurry in the first reactor and the corresponding parameters and results are shown also in Table 2. It may be seen that when the solids content is lower, in the Comparative Example 25 wt % in the slurry of the first reactor, the hexene/ethylene ratio in the second reactor is increased as compared to the value for Example 1. This means that the density of the polyethylene resin fraction produced in the second reactor is increased and the density of the polyethylene resin fraction produced in the second reactor is decreased. As a consequence, there is less separation between the reactors and less differential between the density of the two resin fractions. This means that the polyethylene resin fraction produced in the first reactor is required to have a higher density than for Example 1 with consequential decrease in the slow crack growth resistance, as confirmed by the FNCT test for Comparative Example 1. Also, the Charpy impact energy is reduced and the catalyst productivity is reduced in Comparative Example 1 as compared to Example 1.

Furthermore, the throughput of reactors is also reduced.

EXAMPLE 2

In this Example a yet higher solids content in the first reactor, which was employed for producing a high molecular weight resin fraction in the first reactor and a low molecular weight resin fraction in the second reactor was employed, the solids content in the first reactor being 45 wt % based on the weight of the diluent. The corresponding process parameters are summarised in Table 3. It may be seen that with an even higher solids content in the first reactor, the throughput is yet further increased and the ethylene/isobutane ratio in the first reactor is further increased. Most importantly, the 1-hexene/ethylene ratio in the second reactor is significantly reduced. In this Example, the first reactor was not provided with settling leg incorporating a valve but instead a product take-off from the loop was carried out from the first reactor. It may be seen that the low 1-hexene/ethylene ratio in the second reactor indicates a very high level of reactor independence.

Comparative Example 2

When the apparatus employed for Example 2 was employed in Comparative Example 2 at a lower solids content in the first reactor of only 17%, the throughput and the ethylene/isobutane ratio in the first reactor were reduced. The results are shown also in Table 3. Most importantly, the 1-hexene/ethylene ratio in the second reactor was substantially increased as compared to Example 2, showing reduced independence of the reactors at lower solids content.

TABLE 1

| Reactor Size ($m^3$) | Reactor internal diameter –cm (inches) | Preferred pump minimum operating power (kW) | Most preferred minimum operating pump power (kW) |
|---|---|---|---|
| 10 | 56 (22) | 200 | 220 |
| 70 | 61 (24) | 330 | 400 |
| 100 | 61 (24) | 450 | 530 |

TABLE 2

|  | Example 1 | Comparative Example 1 |
|---|---|---|
| Solids wt % | 32 | 25 |
| Throughput (T/h) | 5 | 3.8 |
| C2/iC4 out R1 (wt %) | 0.71 | 0.58 |
| [C6]/[C2−] in R2 (wt %) | 0.61 | 0.68 |
| [H2]/[C2−] in R2 (vol %/wt %) | 0.42 | 0.46 |
| FNCT at 95° C. and 4 MPa (h) | 2000 | 360 |
| Charpy impact at −10° ($J/m^2$) | 15 | 14 |
| Catalyst productivity (g/g) | 9000 | 8000 |

TABLE 3

|  | Example 2 | Comparative Example 2 |
|---|---|---|
| Solids wt % | 45 | 17 |
| Throughput (kg/h) | 10 | 8 |
| C2/iC4 out R1 (wt %) | 0.85 | 0.33 |
| [C6]/[C2−] in R2 (wt %) | 0.067 | 0.175 |
| [H2]/[C2−] in R2 (vol %/wt %) | 21 | 15 |

The invention claimed is:

1. A process for producing bimodal polyethylene resins in two reactors in series, the process comprising producing a first polyethylene resin fraction in a first slurry loop reactor in a diluent in the presence of a catalyst and producing a second polyethylene resin fraction in a second slurry loop reactor, serially connected to and downstream of the first reactor, in the diluent in the presence of the catalyst, the first polyethylene resin fraction being passed from the first reactor to the second reactor together with the catalyst, producing in one of the first and second reactors a resin fraction of higher molecular weight than the molecular weight of the resin fraction produced by the other of the first and second reactors, supplying the first reactor with a feed of ethylene and diluent having an ethylene content of at least 70 wt. % based on the weight of the diluent wherein in the first reactor the slurry of polyethylene in the diluent has a solids content of at least 30 wt. % based on the weight of the diluent.

2. A process according to claim 1 wherein the catalyst is a Ziegler-Natta catalyst and the slurry in the first reactor has a solids content of from 30 to 60 wt. % based on the weight of the diluent.

3. A process according to claim 1 wherein the catalyst is a Ziegler-Natta catalyst and the feed of ethylene and diluent supplied to the first reactor has an ethylene content of from 70 to 250 wt. % based on the weight of the diluent.

4. A process according to claim 1 wherein the catalyst is a metallocene catalyst and the slurry in the first reactor has a solids content of from 35 to 60 wt. % based on the weight of the diluent.

5. A process according to claim 1 wherein the catalyst is a metallocene catalyst and the feed of ethylene and diluent supplied to the first reactor has an ethylene content of from 70 to 250 wt. % based on the weight of the diluent.

6. A process according to claim 1 wherein the slurry of polyethylene and diluent in the first reactor has a solids content of at least 45 wt. % and the first polyethylene resin fraction is continuously removed from the first reactor.

7. A process according to claim 1 wherein the higher molecular weight resin fraction is produced in the first reactor by copolymerization of ethylene and a comonomer comprising at least one α-olefin having from 3 to 12 carbon atoms.

8. A process according to claim 1 wherein the lower molecular weight polyethylene resin fraction is produced in the second reactor by homopolymerization of ethylene in the presence of hydrogen.

9. A process according to claim 1 wherein the diluent is under supercritical phase conditions in the first reactor.

10. A process according to claim 1 wherein the first polyethylene resin fraction is continuously transferred from the first reactor to the second reactor.

11. A process according to claim 1 wherein the second polyethylene resin fraction is continuously removed from the second reactor.

12. A process according to claim 1 wherein the lower molecular weight polyethylene resin fraction is produced in the first reactor by homopolymerization of ethylene in the presence of hydrogen.

13. A process according to claim 1 wherein the higher molecular weight fraction is produced in the second reactor by copolymerization of ethylene and a comonomer comprising at least one α-olefin having from 3 to 12 carbon atoms.

14. A process for producing a bimodal polyethylene resin in first and second slurry loop reactors connected in a series comprising:
(a) supplying a feed comprising a diluent, ethylene in an amount within the range of 70–250 wt. % based upon the weight of said diluent, an alpha olefin comonomer having from three to 12 carbon atoms and a polymerization catalyst to said first reactor;
(b) copolymerizing said ethylene and said comonomer in said first reactor to produce a relatively high molecular weight copolymer resin fraction in said first reactor;
(c) transferring said copolymer fraction, diluent and catalyst from said first slurry loop reactor to said second slurry loop reactor;
(d) supplying a feed stream comprising ethylene and hydrogen to said second reactor;
(e) polymerizing ethylene in the presence of hydrogen in said second reactor to produce a second polyethylene resin fraction in said second reactor by the homopolymerization of ethylene in the presence of hydrogen, said second polyethylene resin fraction having a lower molecular weight than the resin fraction produced in said first reactor; and
(f) recovering a bimodal polyethylene resin comprising said copolymer and said homopolymer from said second reactor.

15. The process of claim 14 wherein said alpha-olefin comonomer is present in the feed supplied to the first reactor in a concentration within the range of 2–15 wt. % based upon the weight of the diluent.

16. The process of claim 14 wherein said alpha olefin comonomer is selected from the group consisting of butene, hexene and octene.

17. The process of claim 14 wherein said alpha olefin comonomer is hexene.

18. The process of claim 14 wherein said catalyst is a Ziegler-Natta catalyst.

19. The process of claim 14 wherein said catalyst is a metallocene catalyst.

20. The process of claim 14 wherein said copolymer fraction, diluent and catalyst is continuously transferred from said first reactor to said second reactor.

21. A process for producing a bimodal polyethylene resin in first and second slurry loop reactors connected in a series comprising:
(a) supplying a feed comprising a diluent, ethylene, hydrogen and a polymerization catalyst to said first reactor wherein the ethylene concentration in the feed supplied to said first reactor is within the range of 70–250 wt. % based upon the weight of the diluent;
(b) polymerizing said ethylene in said first reactor to produce a relatively low molecular weight polyethylene resin fraction in a slurry in the diluent in said first reactor;
(c) transferring said polyethylene resin fraction, diluent and catalyst from said first slurry loop reactor to said second slurry loop reactor;
(d) supplying a feed stream comprising ethylene and a $C_3$–$C_{12}$ alpha olefin comonomer to said second reactor;
(e) copolymerizing said ethylene and said $C_3$–$C_{12}$ alpha olefin comonomer in said second reactor to produce a second copolymer resin fraction in said second reactor by the copolymerization of ethylene and said $C_3$–$C_{12}$ alpha olefin, said second copolymer resin fraction having a higher molecular weight than the resin fraction produced in said first reactor; and
(f) recovering a bimodal polyethylene resin comprising said copolymer and said homopolymer from said second reactor and supplying said bimodal polyethylene resin for further processing in an extruder without additional polymerization.

22. A process for producing a bimodal polyethylene resin in first and second slurry loop reactors connected in a series comprising:
(a) supplying a feed comprising a diluent, ethylene, hydrogen and a metallocene polymerization catalyst to said first reactor;
(b) polymerizing said ethylene in said first reactor to produce a relatively low molecular weight polyethylene resin fraction in a slurry in the diluent in said first reactor wherein said catalyst is a metallocene catalyst and the slurry in the first reactor has a solids content within the range of 35 to 60 wt. % based on the weight of the diluent;
(c) transferring said polyethylene resin fraction, diluent and catalyst from said first slurry loop reactor to said second slurry loop reactor;
(d) supplying a feed stream comprising ethylene and a C3–C12 alpha olefin comonomer to said second reactor;
(e) copolymerizing said ethylene and said C3–C12 alpha olefin comonomer in said second reactor to produce a second copolymer resin fraction in said second reactor by the copolymerization of ethylene and said C3–C12 alpha olefin, said second copolymer resin fraction having a higher molecular weight than the resin fraction produced in said first reactor; and
(f) recovering a bimodal polyethylene resin comprising said copolymer and said homopolymer from said second reactor and supplying said bimodal polyethylene resin for further processing in an extruder without additional polymerization.

* * * * *